T. Z. MILLARD, B. H. OSTERHOUDT AND C. R. CHENEY.
GEARLESS TRANSMISSION AND DIFFERENTIAL MECHANISM.
APPLICATION FILED OCT. 30, 1917.
1,307,917.
Patented June 24, 1919.
2 SHEETS—SHEET 1.
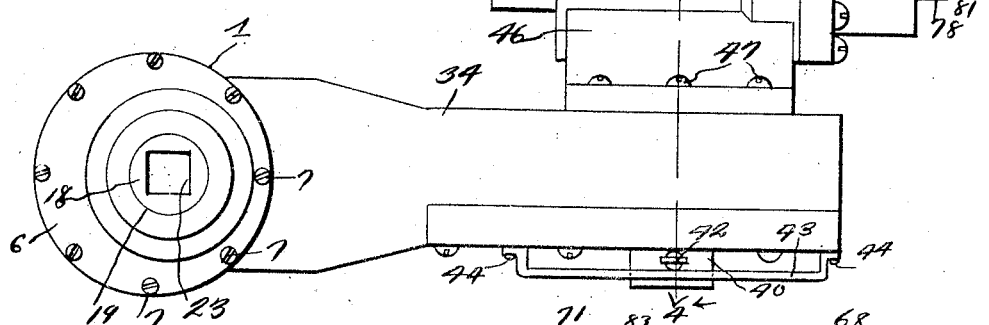
Fig. 1.
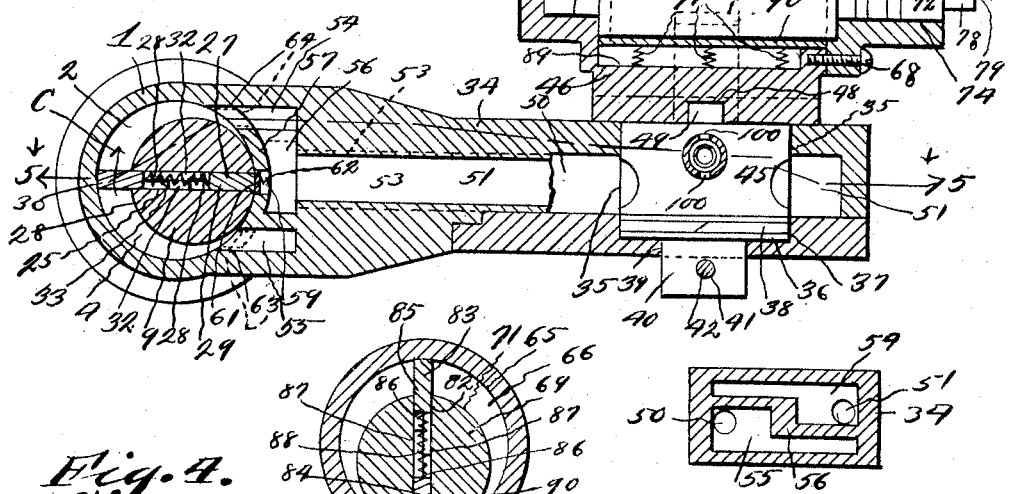
Fig. 3.
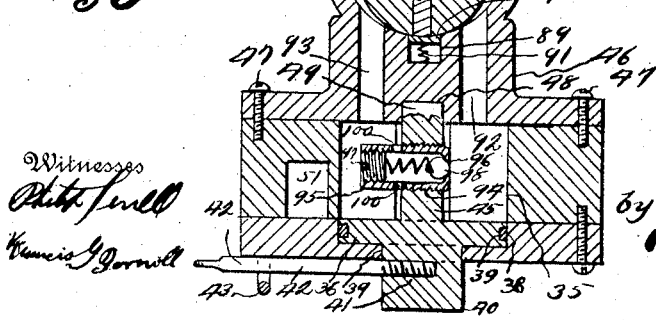
Fig. 4.
Fig. 7.
Witnesses
Inventors
T. Z. Millard
B. H. Osterhoudt and
C. R. Cheney
by D. Swift & Co.
their Attorneys T. Z. MILLARD, B. H. OSTERHOUDT AND C. R. CHENEY.
GEARLESS TRANSMISSION AND DIFFERENTIAL MECHANISM.
APPLICATION FILED OCT. 30, 1917.
1,307,917.
Patented June 24, 1919.
2 SHEETS—SHEET 2.
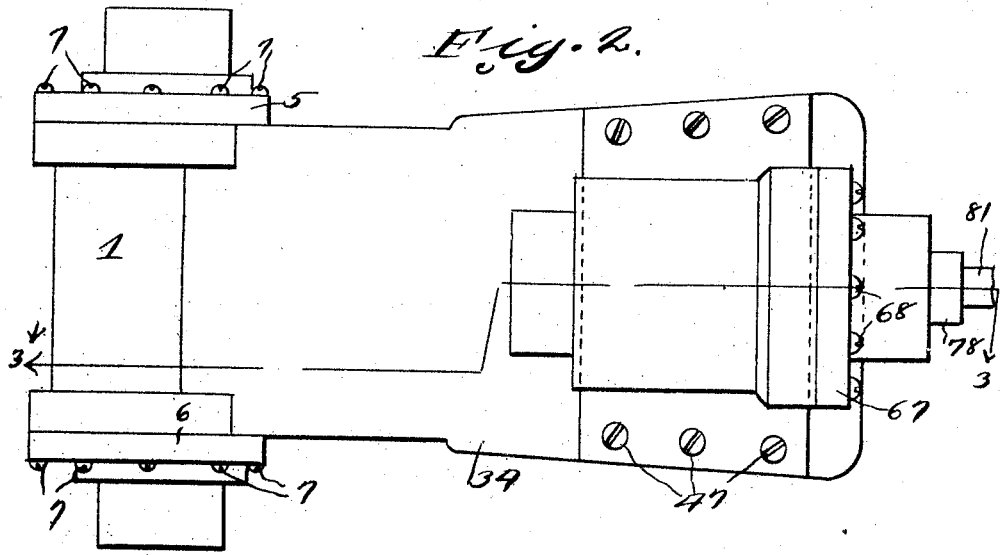
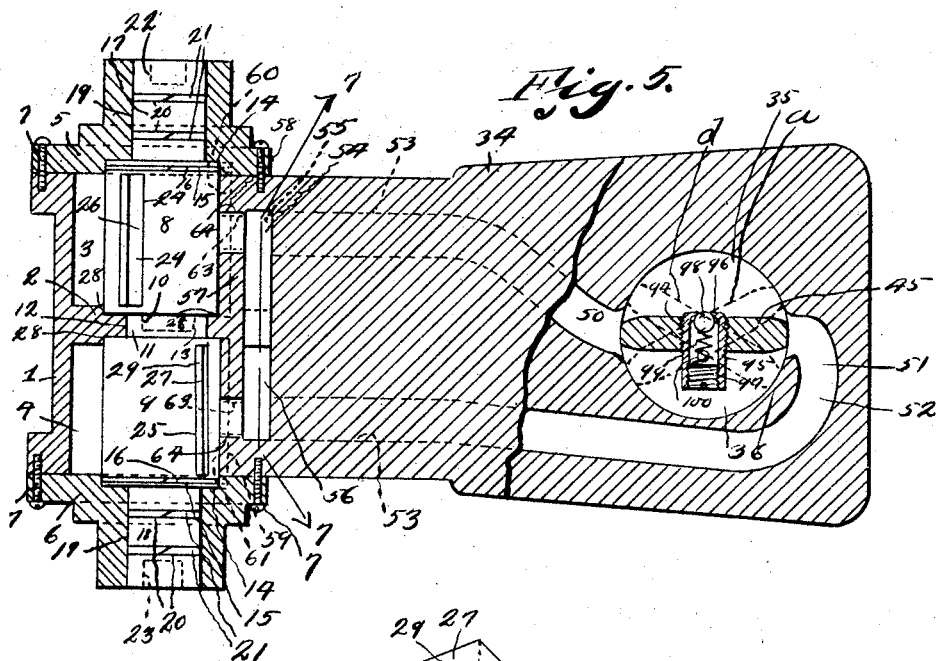

UNITED STATES PATENT OFFICE.

THOMAS Z. MILLARD, BURTON H. OSTERHOUDT, AND COREY R. CHENEY, OF BLOOMFIELD, IOWA.

GEARLESS TRANSMISSION AND DIFFERENTIAL MECHANISM.

1,307,917.  Specification of Letters Patent.  Patented June 24, 1919.

Application filed October 30, 1917. Serial No. 199,324.

*To all whom it may concern:*

Be it known that we, THOMAS Z. MILLARD, BURTON H. OSTERHOUDT, and COREY R. CHENEY, citizens of the United States, residing at Bloomfield, in the county of Davis, State of Iowa, have invented a new and useful Gearless Transmission and Differential Mechanism; and we do hereby declare the following to be a full, clear, and exact description of the invention, such as will enable others skilled in the art to which it appertains to make and use the same.

This invention relates to an improved power transmission and differential mechanism, and one of the objects of the invention is to provide a hydraulically operated mechanism of this kind, therefore providing a mechanism which is entirely gearless.

A further object of the invention is to provide a hydraulic connection between an automobile engine shaft and the two sections of a rear drive axle, which connection comprises an endless passage, and a radially slidable piston on the engine shaft (which is eccentrically mounted in a chamber of said passage) for forcing hydraulic means such as oil or the like through the passage, so as to actuate the pistons on the sections of the drive axle, whereby revoluble movement may be imparted to said sections.

A further object of the invention is the provision of means for changing the course of the hydraulic means.

A further object of the invention is the provision of means for overcoming the excessive pressure of the hydraulic means on one side of the means for changing the course of the fluid or oil.

In practical fields the details of construction may necessitate alterations falling within the scope of what is claimed.

The invention comprises further features and combination of parts as hereinafter set forth, shown in the drawings and claimed.

In the drawings:—

Figure 1 is a view in side elevation of the improved transmission and differential mechanism.

Fig. 2 is a plan view of the same.

Fig. 3 is a sectional view on line 3—3 of Fig. 2.

Fig. 4 is a sectional view on line 4—4 of Fig. 1.

Fig. 5 is a sectional view on line 5—5 of Fig. 3.

Fig. 6 is a detail view of the two sections of one of the pistons carried by one of the drive axle sections.

Fig. 7 is a sectional view on line 7—7 of Fig. 5.

Referring more especially to the drawings, 1 designates a casing, which is substantially cylindrical, and is provided with a substantially circular division wall 2, consequently dividing the casing into the chambers 3 and 4. Suitable cylinder heads 5 and 6 are secured by screws 7 to the ends of said casing. Rotors 8 and 9 (which are cylindrical) are mounted centrally in said chambers 3 and 4. The adjacent ends of the rotors are provided with reduced extensions 10 and 11. The reduced extension 11 is mounted in a bearing 12 of the wall 2 and is provided with a socket 13, to receive the reduced extension 10 of the rotor 8. By means of this construction the rotors may revolve independently of each other and in true axial alinement. The inner faces of the cylinder heads 5 and 6 are provided with depressions 14, to receive portions of the outer ends of said rotors. The circumference of the outer ends of said rotors are provided with annular grooves 15, to receive the split packing rings 16. Projecting from the outer ends of said rotors are reduced cylindrical extensions 17 and 18, which fit cylindrical bearings 19 of the heads 5 and 6. The reduced extensions 17 and 18 are provided with annular grooves 20 to receive the split packing rings 21. By virtue of the rings 16, 20 and 21 leakage of the hydraulic means or oil is prevented. The outer ends of said reduced extensions 17 and 18 are provided with sockets 22 and 23, which are rectangular in cross section as shown clearly in Fig. 1, and are adapted to receive correspondingly shaped reduced extensions (not shown) of axially alined rear drive axle sections (not shown), whereby as revoluble movement is imparted to the rotors in one direction or the other, corresponding movement is imparted to said axle sections. It is to be noted that since the rotors are movable independent of each other, and that said axle sections are rotatable with said rotors respectively, a differential connection is provided, whereby the axle sections may rotate at different speeds. The rotors 8 and 9 respectively are provided with transverse pockets 24 and 25, in which the pistons 26 and 27 are respectively mounted for reciprocating radial movement. The inner ends of the rotors are mounted in recesses 28 of the opposite faces of the division wall 2, so as to insure even movement of the rotors. Each piston consists of two sections 29 and 30, and their adjacent portions are provided with recesses 31, and reduced parts 32, which engage the recesses 31 respectively, consequently providing an overlapping connection between the two sections of the piston. A coil spring 33 is interposed between the two sections 29 and 30 of each piston, in order to hold the sections sufficiently separated, whereby the outer edges of the sections may wipe the inner circumference of the chamber in which the rotor revolves. Projecting from the casing 1 forwardly is an extension casing 34, the forward end of which is provided with a circular cavity 35. In the lower part of the cavity 35 a disk 36 is mounted for rocking movement. The peripheral edge of the disk 36 has an annular groove 37, which receives a split packing ring 38, to prevent leakage of the hydraulic means or oil. The bottom wall of the cavity 35 has a reduced opening 39, forming a bearing for the reception of the lower reduced extension 40 of said disk 36. The extension 40 has a transverse opening 41, in which a lever 42 is threaded. A U-shaped guide bar 43 has its angular ends secured at 44 to the under part of the forward end of the extension casing 34. This guide bar constitutes a guide for the lever 42, to which any suitable means (not shown) may be connected, whereby the disk 36 may be rocked in its bearing, from a neutral position to either a reverse or forward position. Carried by the disk 36 in any suitable manner and rising upwardly therefrom is a valve blade or member 45, the ends of which wipe the inner circumference of the cavity 35. A super-imposed transmission casing 46 is secured by bolts 47 on the upper face of the forward end of the extension casing 34. The under part of the base of the hydraulic transmission casing 46 has a socket 48 for the reception of the cylindrical extension 49 of the valve blade or member 45, so that said valve blade may be rocked accurately in its cavity. Extending from and in communication with the cavity 35 at forward and rear diametrically opposite portions of said cavity 35 are the ducts or passages 50 and 51. The passage 51 extends partly forwardly and is curved laterally at 52 and extends rearwardly substantially in parallelism with the rearwardly extending passage 50. The rear portions 53 of said passages 50 and 51 merge into and are in communication with upper and lower chambers 54 and 55. By means of an L-shaped wall 56 said chambers 54 and 55 are formed. A wall 57 separates the upper and lower chambers 54 and 55 from the chambers 3 and 4, in which the rotors are revolubly mounted. The central portion of this wall 57 are provided with elongated cavities 58 and 59, in which packing strips 60 and 61 are mounted, there being springs 62 to force the packing strips 61 rearwardly and in contact with the circumference of said rotors, wiping against them to prevent leakage of the hydraulic means or oil. The lower part of said wall 57 adjacent the lower chamber 55 is provided with ports 63, which form communications between the lower chamber 55 and the under parts of the rotor chambers 3 and 4. The upper portion of the wall 57 is provided with ports of communication 64 between the upper chamber 54 and the upper parts of the rotor chambers 3 and 4. The transmission casing 46 is provided with a cylindrical chamber 65, one end of which is closed by a solid wall 66, while the other end is closed by a cylinder head 67 which is secured to said casing by the screws 68. Mounted in the chamber 65 is a cylindrical rotor 69, the ends of which engage annular recesses 70 and 71 of the heads 66 and 67 respectively. The ends of the rotor 69 are provided with reduced cylindrical extensions 72 and 73, which fit the bearings 74 and 75 of the heads 66 and 67 respectively. The cylindrical extension 72 is provided with annular grooves 76 for the reception of the split spring packing rings 77, to prevent leakage of the hydraulic means or oil. An auxiliary extension 78 projects axially from the extension 72 and has a socket 79 rectangular in cross section, for the reception of a correspondingly shaped part 80 of the engine shaft 81, which, when rotated the motive power of the engine (not shown), imparts movement to the rotor 69. The rotor 69 is provided with a transverse pocket or slot 82, in which a piston 83 is mounted for radial reciprocating movement. This piston 83 consists of two sections 84 and 85, the adjacent portions of which are provided with interengaging recesses and tongues 86 and 87, thereby overlapping the sections 84 and 85. A coil spring 88 is interposed between the piston sections 84 and 85 to hold the inner ends of the recesses and the ends of the tongues spaced, and to also hold the outer end edges of said sections 84 and 85 in wiping contact with the inner circumference of the chamber 65. It is to be observed that the rotor 69 is mounted eccentrically in the chamber 65, so that as the rotor revolves, a reciprocating movement is imparted to the sections of the pistons. In other words as one section moves inwardly, the other section moves outwardly, the spring 88 operating to assist said sections in such movements. The lower portion of the cylindrical wall of the chamber 65 is provided with an elongated recess 89 for the reception of the packing strip 90, against which the circumference of the rotor 69 wipes during its revoluble movement. Springs 91 are interposed between the packing strip 90 and the bottom of the recess 89, to hold the strip 90 in contact with the rotor. The lower portion of the chamber 65 is in communication with the cavity 35 by means of the ports 92 and 93. Mounted in the valve blade or member 45 by means of threaded connections 94 is a tube 95, one end of which has a flanged opening 96, while its other end is closed by means of a plug 97, which is threaded into said tube. A ball valve 98 is arranged in the tube and adapted to engage a valve seat of the flange of the opening 96, there being a spring 99 interposed between the plug 97 and the ball check valve 98 to hold the ball check valve seated normally. The tube 95 in its wall is provided with an opening 100, so that if the pressure of oil on the side of the valve blade or member 45 adjacent the ball valve 98 is too great, said ball valve will be overcome, consequently unseated, and allow the oil to spill or pass through the tube 95 into the exhaust side of the valve blade. In the operation, the endless passage through the transmission casing and the extension casing 34 and the differential casing is filled with the requisite amount of oil, or other suitable hydraulic means. Referring to Fig. 1 it will be noted that the lever 42 is in its neutral position. To the right of the neutral position, the lever 42 may be moved so as to drive the automobile forwardly. The lever 42 may be moved to the left, in other words to a reverse position, to drive the automobile rearwardly. For example when the lever 42 is moved to the right the valve blade 45 is moved to its dotted line position as indicated at $a$. In this case, since revoluble movement is imparted to the engine shaft 81 in the direction of the arrow $b$, one of the sections of the piston 83 forces the oil from the chamber 65 through the port 92 on to one side of the valve blade or member 45, thence through the passage 50 into the lower chamber 55, through the ports 63, into the chambers 3 and 4 of the differential casing and under the pistons 27, consequently imparting movements to the rotors 8 and 9, which in turn imparts corresponding movements to the axle sections (not shown) driving the automobile forwardly. As one side of each piston 27 passes the ports 64, said piston moving in the direction of the arrow $c$ the oil or hydraulic means is exhausted through the ports 64 into the upper chamber 54 and then through the passage 51 through the depression 35 on the other side of the valve blade 45, thence upwardly through the port 93 and back to the chamber 65. This endless flow of hydraulic means or oil continues as long as the engine shaft is turning to drive the automobile forwardly. To reverse the automobile the lever 42 is moved to the left, which will alter the position of the valve blade as shown in dotted lines at $d$. By so positioning the valve blade the course of the oil is altered, sending the oil first through the passage 51 and returning it through the passage 50, consequently operating on the opposite sides of the pistons 27 and rotating the rotors 8 and 9, and the rear axle sections (not shown) in the opposite directions.

The invention having been set forth what is claimed as new and useful is:—

1. In a hydraulic transmission casing, a revoluble driving member, a transmission casing, a rotor eccentrically mounted in said casing and being detachably coupled with the driving member, said casing having a pair of ports extending in parallelism from the chamber of the casing and offset on either side of the center of the casing, said rotor having a transversely disposed pocket, a piston in said pocket comprising two sections, and adapted to move alternately inwardly and outwardly, and toward each other simultaneously, whereby the fluid or hydraulic means is forced out through one port and allowed to enter through the opposite port, and means for changing the course of the hydraulic means, said last named means comprising a casing below the transmission casing provided with a valve blade chamber in communication with said ports, said last named casing having a bearing, a disk in said bearing and carrying a valve blade operable in the valve blade chamber, said last named casing having a pair of passages for conveying hydraulic means into and from the valve blade chamber, and means to be manually actuated for adjusting the valve blade for changing the course of said hydraulic means.

2. The combination with a driving member, of a hydraulic transmission device operable by the driving member, a hydraulic differential mechanism, hydraulic means of communication between the two mechanisms, whereby the differential mechanism may operate members to be driven, a chamber in said hydraulic means of communication between the two mechanisms, through which the hydraulic means is adapted to pass, the bottom of said chamber having a bearing, a rocking disk in said bearing and provided with a valve blade operable in the chamber, means connected to the disks and adapted to be manually manipulated for rocking the disk, whereby the valve blade may be positioned in the chamber for changing the course of the hydraulic means from the transmission mechanism to the differential mechanism and vice versa, and means carried by the valve blade for relieving the excessive pressure of oil on either side of the blade.

3. The combination with a casing having a valve blade chamber and ports for carrying the hydraulic fluid into and from said chamber, of a differential casing at the rear of and connected to the first casing, said differential casing having a pair of rotor chambers, separate and independently revoluble rotors mounted eccentrically in said rotor chambers, pistons carried by said rotors, said differential casing having a space of communication between the opposite ends of the lower parts of said rotor chambers, said differential casing having a second space of communication communicating the opposite ends of the upper parts of said rotor chambers, said first casing having a pair of passages extending from diametrically opposite points of the valve blade chamber and through said first casing and being communicatively connected respectively with said spaces, for conveying the hydraulic fluid into and from the rotor chambers to act upon the pistons to impart movement to the rotor, means comprising a valve blade mounted in said valve blade chamber for changing the course of the hydraulic fluid, means carried by said valve blade for relieving the excessive pressure of the hydraulic fluid on either side of the blade, and manually operated means for adjusting the valve blade.

In testimony whereof we have signed our names to this specification in the presence of two subscribing witnesses.

THOMAS Z. MILLARD.
BURTON H. OSTERHOUDT.
COREY R. CHENEY.

Witnesses:
HERBERT KING,
BYRON BALLIN.

Copies of this patent may be obtained for five cents each, by addressing the "Commissioner of Patents, Washington, D. C."